Sept. 10, 1929.  E. T. CADY  1,727,327
METHOD OF MAKING INSOLES
Filed Nov. 8, 1922
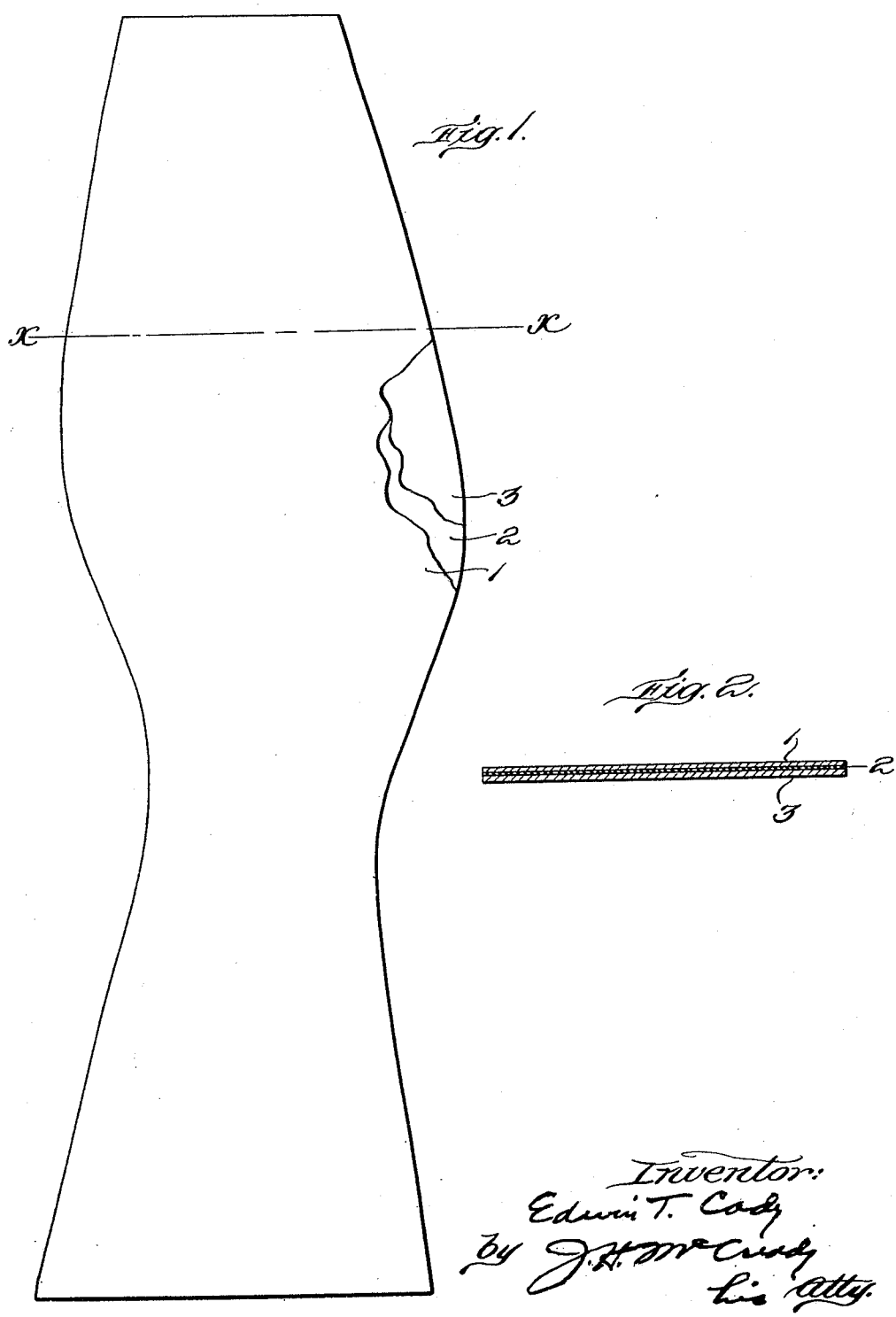

Patented Sept. 10, 1929.

1,727,327

UNITED STATES PATENT OFFICE.

EDWIN T. CADY, OF NEWTON, MASSACHUSETTS.

METHOD OF MAKING INSOLES.

Application filed November 8, 1922. Serial No. 599,675.

This invention relates to insoles for shoes, and it has for its general object to produce an entirely satisfactory insole from grades of leather which heretofore have been considered unsuitable for this purpose. The invention is especially concerned with the use of the very thin, flexible, split sole leather which heretofore has found a use in footwear chiefly for sock linings for McKay shoes. This stock is very cheap as compared with the better grades of sole leather, but is too thin to be used as an insole stock.

It has been proposed heretofore to cement together two superposed sheets of this stock and thus to build up a composite sheet of suitable thickness for insoles. This expedient, however, has not proved satisfactory, particularly for Goodyear shoes, since the cement which secures the two sheets together is affected by the perspiration of the foot, the constant flexing to which it is subjected while the shoe is being worn, and by the action of water which works in through the seams and the outsole. It has proved very difficult, therefore, to make an insole of this character which will successfully stand up under the service imposed by these conditions. To devise a satisfactory solution for this problem constitutes the chief object of this invention.

The nature of the invention will be readily understood from the following description when read in connection with the accompanying drawings, and the novel features will be particularly pointed out in the appended claims.

In the accompanying drawings,

Figure 1 is a plan view of an insole blank embodying the present invention; and

Fig. 2 is a cross-sectional view on the line X—X, Fig. 1.

The blank shown consists of upper and lower sheets of leather designated at 1 and 3, respectively, united through the medium of an intermediate sheet 2 of rubber. The parts 1 and 3 consist of thin, flexible, split sole leather of the character above mentioned. For the intermediate sheet of rubber, I prefer to use a good quality of commercial sheet stock, but an unvulcanized Pará rubber produces equally satisfactory results.

According to the usual process of manufacture the pieces 1, 2 and 3 are cut out or "died" out, and they are then secured together in the superposed relationship in which they are shown by means of a suitable cement applied to the leather pieces before they are assembled with the intermediate sheet. The pieces are then pressed firmly together to bring them into intimate contact. As soon as the solvent in the cement evaporates, the adhesive residue left behind securely unites the leather and rubber sheets.

For Goodyear insoles the lower sheet 1 should be thick enough for channelling, the minimum thickness required for this purpose being about two irons. The upper sheet may be as thin as one iron, the thickness of the stock used for both sheets depending chiefly on the desired thickness of the finished insole. The intermediate sheet of rubber is preferably from one-half to one iron in thickness in the finished blank, although these limits may be varied to suit the requirements of the shoe manufacturer. In any event, the sheet of rubber is of substantial thickness, as distinguished from simply a film of cement, such as has been used heretofore in cementing two pieces of leather together. For McKay shoes, stitch-downs, and the like, it is not necessary that one of the leather sheets be thicker than the other. In fact, this is not necessary for Goodyear insoles provided one sheet is thick enough for channelling. It will be understood, of course, that the blanks of the character shown are shipped to shoe factories and are there cut out to the desired form, and channelled, or otherwise manipulated in accordance with the practices of the individual manufacturers.

The intermediate sheet 2 of rubber not only serves the purpose of securely uniting the upper and lower leather sheets 1 and 3, but it has two other important practical advantages as well;—first, of making the insole impervious to water; and second, of providing a cushion between the two soles. The latter not only aids in making the shoe more comfortable to wear, but it also reduces the strain on the adhesive film between each of the leather sheets and the rubber sheet. In other words, the fact that the two sheets of leather are separated by a flexible and elastic sheet of rubber enables each of the leather pieces to move slightly relatively to the other as the insole is flexed in walking, and thus reduces substantially the strain which otherwise would be produced on the adhesive union between adjacent sheets. In this respect the use of an unvulcanized Pará rubber is advantageous because of its high degree of elasticity. Furthermore, its peculiar rough surface when sheeted seems to assist in forming a very firm union or bond with the leather pieces.

While it is necessary in making a Goodyear insole, in the manner above described, to use one sheet of leather of such a thickness that it might be used as an insole in some shoes, still the demand for these very light weight stocks is exceedingly limited, and there is very little market indeed for the thinner stock used in the insole shown. The present invention, however, produces an insole from these light weight stocks which is superior in some respects to the insoles made from the heavier grades of stock.

Having thus described my invention, what I desire to claim as new is:

1. That improvement in the process of manufacturing insole blanks which consists in adhesively uniting two sheets of leather, each having the shape of an insole blank, to the opposite faces of an intermediate sheet of highly elastic rubber of similar shape and area, and pressing all of said sheets firmly together to secure them permanently to each other throughout their areas without vulcanization.

2. In the art of manufacturing footwear, the method of uniting a plurality of members of material other than crude rubber which comprises the interpositioning between two such members to be united, of a strip of crude rubber in sheet form, and then applying pressure to produce adhesion to the strip of both members.

EDWIN T. CADY.